US012767208B2

(12) United States Patent
Lapis

(10) Patent No.: US 12,767,208 B2
(45) Date of Patent: Oct. 20, 2026

(54) MOTOR VEHICLE AND METHOD FOR OPERATING A MOTOR VEHICLE WITH A STEER-BY-WIRE STEERING SYSTEM AND A DRIVING DYNAMICS CONTROL SYSTEM

(71) Applicants: thyssenkrupp Presta AG, Eschen (LI); thyssenkrupp AG, Essen (DE)

(72) Inventor: Leonard Lapis, Sennwald (CH)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 0 days.

(21) Appl. No.: 19/073,649

(22) Filed: Mar. 7, 2025

(65) Prior Publication Data

US 2025/0282412 A1 Sep. 11, 2025

(30) Foreign Application Priority Data

Mar. 11, 2024 (BE) .................................. 2024/5139

(51) Int. Cl.
*B62D 5/00* (2006.01)
*B62D 5/04* (2006.01)

(52) U.S. Cl.
CPC ............. *B62D 5/001* (2013.01); *B62D 5/046* (2013.01); *B62D 5/0481* (2013.01)

(58) Field of Classification Search
CPC ...... B62D 5/001; B62D 5/046; B62D 5/0481; B62D 6/003; B62D 7/159; B62D 9/005;
(Continued)

(56) References Cited

U.S. PATENT DOCUMENTS 8,234,043 B2 7/2012 Yasutake et al.
2015/0246687 A1 9/2015 Takeda
(Continued)

FOREIGN PATENT DOCUMENTS

DE 103 25 548 A1 6/2004
DE 10 2005 036 708 A1 8/2006
(Continued)

OTHER PUBLICATIONS

Machine Translation of DE 102014208625 A1 pdf File Name: "DE102014208625A1_Machine_Translation.pdf" (Year: 2015).*
(Continued)

*Primary Examiner* — Grant Moubry
*Assistant Examiner* — Ruben Picon-Feliciano
(74) *Attorney, Agent, or Firm* — thyssenkrupp North America, LLC

(57) ABSTRACT

A method for operating a motor vehicle with a steer-by-wire steering system and a driving dynamics control system comprises converting, by the steer-by-wire steering system, a steering specification into a wheel steering angle of steerable wheels of the motor vehicle, and wherein the driving dynamics control system, taking into account a driving direction specification and a driving state of the motor vehicle, carries out an evaluation with respect to a critical driving situation and, if a critical driving situation is detected, stabilizes the motor vehicle by targeted control of at least one brake of the motor vehicle and/or at least one drive unit of the motor vehicle in order to rectify the critical driving situation, wherein, in addition to the driving dynamics control system, a driving state evaluation unit carries out an evaluation with respect to a critical driving situation and, if a critical driving situation is detected by the driving state evaluation unit, the wheel steering angle is changed in order to stabilize the motor vehicle.

12 Claims, 4 Drawing Sheets

(58) Field of Classification Search
CPC ......... B60W 2710/02; B60W 2710/06; B60W 2710/18; B60W 30/045; B60W 2510/207; B60W 2710/20
See application file for complete search history.

(56) References Cited

U.S. PATENT DOCUMENTS

| | | | |
|---|---|---|---|
| 2019/0176874 | A1 | 6/2019 | Sanford et al. |
| 2022/0227354 | A1 | 7/2022 | Hagiwara |

FOREIGN PATENT DOCUMENTS

| | | | | | |
|---|---|---|---|---|---|
| DE | 10 2006 042 666 | A1 | | 3/2008 | |
| DE | 11 2006 001 908 | T5 | | 5/2008 | |
| DE | 10 2013 222 586 | A1 | | 5/2015 | |
| DE | 102014208625 | A1 | * | 11/2015 | ............ B60W 30/02 |
| DE | 102017216086 | A1 | | 3/2019 | |
| DE | 10 2020 205 904 | A1 | | 11/2021 | |
| DE | 102017216019 | B4 | | 12/2021 | |
| DE | 102021212197 | B3 | | 12/2022 | |
| DE | 10 2021 207 263 | A1 | | 1/2023 | |
| EP | 1890920 | B1 | * | 4/2013 | ............... B62D 6/00 |
| JP | 7138611 | B2 | | 4/2021 | |

OTHER PUBLICATIONS

Machine Translation of EP 1890920 B1 pdf File Name: "EP1890920B1_Machine_Translation.pdf" (Year: 2013).*

* cited by examiner

MOTOR VEHICLE AND METHOD FOR OPERATING A MOTOR VEHICLE WITH A STEER-BY-WIRE STEERING SYSTEM AND A DRIVING DYNAMICS CONTROL SYSTEM

CROSS REFERENCE TO RELATED APPLICATION

This application is a U.S. Non-Provisional that claims priority to Belgian Patent Application No. BE 2024/5139, filed Mar. 11, 2024, the entire content of which is incorporated herein by reference.

FIELD

The present disclosure relates to a method for operating a motor vehicle with a steer-by-wire steering system and a driving dynamics control system.

BACKGROUND

Steer-by-wire steering systems and driving dynamics control systems have been known for a long time in the prior art. For example, a steer-by-wire steering system is described in DE 10 2020 205 904 A1. Driving dynamics control systems have already been used in motor vehicles for many years and are in particular also known under the term Electronic Stability Control (ESC for short). Vehicle manufacturers also use different designations, for example ESP (Electronic Stability Program), DSC (Dynamic Stability Control) or VSC (Vehicle Stability Control). Such driving dynamics control systems constantly compare a driving direction specification made by a vehicle user with a driving state of the motor vehicle in order to detect a critical driving situation. If a significant deviation of the driving state from the driving direction specification is detected, such a critical driving situation is present. In such a critical driving situation, the driving dynamics control system attempts to prevent understeer or oversteer of the motor vehicle by braking individual wheels of the motor vehicle and thus to prevent the motor vehicle from swerving. Driving dynamics control systems therefore provide a high increase in safety and have proven themselves in such a way that they are already mandatory in a motor vehicle in many countries.

Further developments in driving dynamics control systems also include active steering interventions by the driving dynamics control system in vehicles with actively controllable steering systems. The problem here is a return transfer of the active steering intervention to the steering handle, whereby a vehicle user can gain the impression that the vehicle is not moving in a specified driving direction and steering does not correspond to the wishes of the vehicle user in this respect. Another problem can be the integration of brake and steering actuator control, because brake and steering systems often come from different suppliers.

Thus a need exists for safety when operating a motor vehicle is intended to be increased further. Advantageously, in order to maintain reliability and advantageously also save costs, the intention is to resort to proven driving dynamics control systems which are designed, if a critical driving situation is detected, to stabilize the motor vehicle by targeted control of at least one brake of the motor vehicle and/or at least one drive unit of the motor vehicle in order to rectify the critical driving situation, but are not designed or at least do not have to be designed to carry out active steering interventions.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
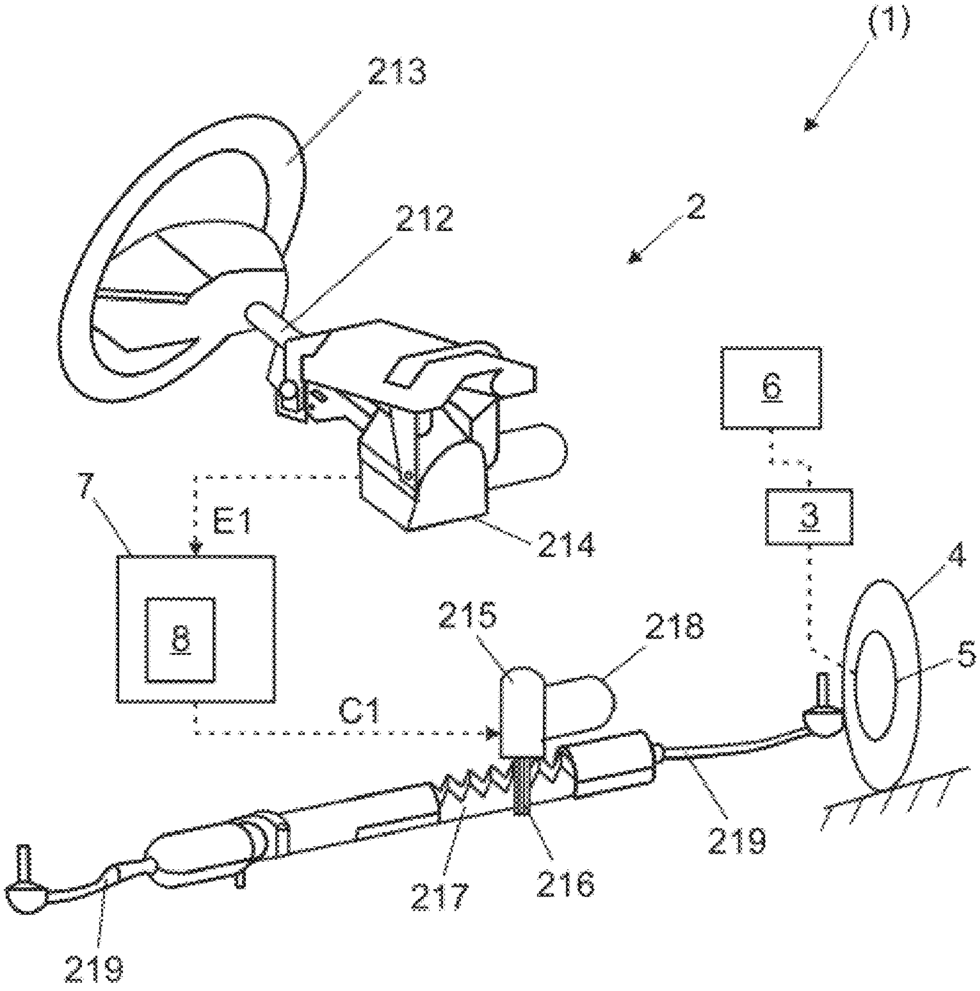
FIG. 1 shows a simplified perspective illustration of a section of an exemplary embodiment of a motor vehicle designed according to the invention.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a method for operating a motor vehicle with a steer-by-wire steering system and a driving dynamics control system, wherein the steer-by-wire steering system converts a steering specification into a wheel steering angle of steerable wheels of the motor vehicle, and wherein the driving dynamics control system, taking into account a driving direction specification and a driving state of the motor vehicle, carries out an evaluation with respect to a critical driving situation and, if a critical driving situation is detected, stabilizes the motor vehicle by targeted control of at least one brake of the motor vehicle and/or at least one drive unit of the motor vehicle in order to rectify the critical driving situation Furthermore, the invention relates to a motor vehicle comprising a steer-by-wire steering system and a driving dynamics control system, wherein the steer-by-wire steering system is designed to convert a steering specification into a wheel steering angle of steerable wheels of the motor vehicle, and wherein the driving dynamics control system is designed, taking into account a driving direction specification and a driving state of the motor vehicle, to carry out an evaluation with respect to a critical driving situation and, if a critical driving situation is detected, to stabilize the motor vehicle by targeted control of at least one brake of the motor vehicle and/or at least one drive unit of the motor vehicle in order to avoid the critical driving situation.

The proposed solution provides a method for operating a motor vehicle with a steer-by-wire steering system and a driving dynamics control system, wherein the steer-by-wire steering system converts a steering specification into a wheel steering angle of steerable wheels of the motor vehicle, and wherein the driving dynamics control system, taking into account a driving direction specification and a driving state of the motor vehicle, carries out an evaluation with respect to a critical driving situation and, if a critical driving situation is detected, stabilizes the motor vehicle by targeted control of at least one brake of the motor vehicle and/or at least one drive unit of the motor vehicle in order to rectify the critical driving situation. The driving direction specification takes into account in particular a steering wheel position, a steering torque and/or a pedal position, in particular a pedal position of a brake pedal of the motor vehicle and/or a pedal position of an acceleration pedal of the motor vehicle. A critical driving situation is present in particular when a captured actual yaw rate for the motor vehicle deviates from a certain target yaw rate for the motor vehicle. However, further and/or other criteria may also be taken as a basis in particular for the presence of a critical driving situation. The method further provides that, in addition to the driving dynamics control system, a driving state evaluation unit carries out an evaluation with respect to a critical driving situation, wherein, if a critical driving situation is detected by the driving state evaluation unit, the wheel steering angle is changed in order to stabilize the motor vehicle. The change in the wheel steering angle is advantageously not caused by the driving dynamics control system and is advantageously not caused by corresponding control by the driving dynamics control system. Instead, provision is advantageously made for a control unit of the steer-by-wire steering system, advantageously triggered by the driving state evaluation unit which may be included in particular in the control unit of the steer-by-wire steering system, to control a steering actuator of the steer-by-wire steering system in order to change the wheel steering angle. The evaluation with respect to a critical driving situation by the driving state evaluation unit is advantageously carried out in addition to the evaluation by the driving dynamics control system, with the result that the evaluations can advantageously be carried out independently of each other.

Advantageously, therefore, a driving dynamics control system known in the prior art can be used for the method, said control system not requiring any modifications in particular with regard to its architecture and/or functioning and advantageously being able to be integrated in a known manner in a motor vehicle. This is achieved in particular by the provided driving state evaluation unit which is preferably included in the steer-by-wire steering system and is advantageously designed as part of the control process for controlling the steering actuator in order to convert a steering specification into a steering movement of the steerable wheels. In particular, provision is thus made for the control unit to control the steering actuator in a normal non-critical driving situation according to a received steering specification, which can be specified in particular by a vehicle user via a steering handle or by a driver assistance system in an autonomous driving mode, with a corresponding control signal. If, on the other hand, the driving state evaluation unit has detected a critical driving situation based on a captured driving direction specification, in particular a steering specification, and a current vehicle state, a control signal for controlling the steering actuator, which would result from the steering specification, is overlaid with a stabilization control signal that is used to control the steering actuator in such a way that the steerable wheels adopt a wheel steering angle that stabilizes the motor vehicle and the critical driving situation is restored to a normal driving situation.

According to one particularly advantageous configuration of the method, it is provided that, if a critical driving situation is detected by the driving state evaluation unit, the driving direction specification is additionally manipulated before transmission to the driving dynamics control system, and the driving dynamics control system, taking into account the manipulated driving direction specification, carries out the evaluation with respect to a critical driving situation. The type of manipulation of the driving direction specification can be set in advance. In particular, various driving programs that can be selected by a vehicle user may be provided, wherein the manipulation of the driving direction specification is different depending on the selected driving program. Advantageously, the manipulation of the driving direction specification may cause a strong reaction of the driving dynamics control system, in particular a stronger control intervention, which advantageously leads to the vehicle being stabilized more quickly in a critical driving situation. Thus, an accident risk can be advantageously reduced. The background to this is that the driving dynamics control system intervenes with less control depending on the driving direction specification and depending on how the driving direction specification changes, for example if a vehicle user themself begins to countersteer in a critical driving situation. However, since the driving dynamics control system can normally react faster and better than a vehicle user, it is advantageous to provide the driving dynamics control system with a manipulated driving direction specification rather than the actual driving direction specification.

The driving direction specification comprises in particular a captured steering specification, wherein advantageously the captured steering specification is manipulated before transmission to the driving dynamics control system. In particular, provision is made for a captured steering specification to be a captured steering wheel angle, in which case a steering wheel angle deviating from the captured steering wheel angle is transmitted to the driving dynamics control system. The deviation is advantageously determined in such a way that a stronger control intervention is caused by the driving dynamics control system, as a result of which the motor vehicle is advantageously stabilized more quickly and the critical driving situation is normalized more quickly.

In particular, provision is made for a captured steering specification to be manipulated by increasing a value for the steering angle underlying the steering specification. Advantageously, increasing the value for the steering angle means that a stronger control intervention is caused by the driving dynamics control system.

One advantageous development of the method provides for the value for the steering angle underlying the steering specification to be increased by replacing the steering angle value actually underlying the captured steering specification with a maximum possible steering angle value of the same steering direction. In particular, provision is thus made for a captured steering angle value of 90° to the left to be transmitted, if a critical driving situation is detected by the driving state evaluation unit, to the driving dynamics control system as the maximum steering angle value of 180° to the left at the current speed as a manipulated driving direction specification. In this way, maximum control interventions are advantageously intended to be caused by the driving dynamics control system.

According to a further advantageous configuration of the method, the driving state of the motor vehicle is transmitted to the driving state evaluation unit and to the driving dynamics control system. The evaluation with respect to a critical driving situation is then advantageously carried out by the driving state evaluation unit and by the driving dynamics control system in each case independently of each other. Advantageously, on the one hand, no changes to the driving dynamics control system are thus required. On the other hand, this further increases driving safety because the driving state evaluation unit now also additionally carries out an evaluation with respect to a critical driving situation.

Provision is further advantageously made for a driving direction specification, in particular a steering wheel position, a steering torque and/or a pedal position and/or a specification by an AD system (AD: autonomous driving), to be transmitted to the driving state evaluation unit, and for the driving direction specification to be transmitted from the driving state evaluation unit to the driving dynamics control system. Advantageously, as already explained, provision may be made for the driving direction specification to be manipulated, in particular to be manipulated by the driving state evaluation unit, before transmission to the driving dynamics control system.

According to a further advantageous configuration of the method, information regarding an actually set wheel steering angle of the motor vehicle is transmitted to the driving state evaluation unit. This actually set wheel steering angle can deviate from a steering specification in particular when the driving state evaluation unit generates a control signal, which deviates from the steering specification and is intended to control the steering actuator of the steer-by-wire steering system, in order to stabilize the motor vehicle in a critical driving situation. Advantageously, the driving state evaluation unit can control the steering actuator in an improved manner by taking into account the actually set wheel steering angle and can stabilize the motor vehicle in a further improved manner in a critical driving situation. In particular, provision may be made for the steer-by-wire steering system to comprise a coupling rod, in particular a rack, which is connected to the steerable wheels of the motor vehicle in a known manner via track rods, wherein the steering actuator acts on the coupling rod in order to adjust a wheel steering angle of the steered wheels. Advantageously, in such a configuration, the position of the coupling rod, in particular the position of a rack, of the steer-by-wire steering system is transmitted to the driving state evaluation unit as information regarding an actually set wheel steering angle of the motor vehicle. In particular, provision is made for the position of the coupling rod to only be transmitted to the driving state evaluation unit and not also additionally transmitted to the driving dynamics control system. Advantageously, this means that the driving dynamics control system intervenes in a controlling manner based on the respectively current driving direction specification and the respectively current driving state in order to stabilize the motor vehicle in a critical driving situation.

A further advantageous configuration of the method provides for the driving state evaluation unit to determine a reference driving line for the motor vehicle based on the information regarding the driving direction specification and the driving state, in particular based on the driving direction specification and the driving state, and to detect a critical driving situation in the event of a deviation from this reference driving line. Advantageously, a target position for the coupling rod of the steer-by-wire steering system is determined from the determined reference driving line and the steering actuator is controlled in order to set the target position of the coupling rod, wherein advantageously the actual position of the coupling rod is transmitted to the driving state evaluation unit. A critical driving situation can thus be advantageously detected with high reliability. Further advantageously, the evaluation with respect to a critical driving situation is carried out by the driving state evaluation unit and by the driving dynamics control system on the basis of different criteria, wherein the driving state evaluation unit advantageously checks a deviation from the determined reference driving line and the driving dynamics control system advantageously checks a deviation from a certain target yaw rate.

In particular, provision is made for the driving state evaluation unit to control a steering actuator of the steer-by-wire steering system in such a way that the wheel steering angle of the steered wheels of the motor vehicle is changed in such a way that the motor vehicle is intended to follow the reference driving line. Advantageously, the control signal generated for this purpose has priority over a control signal which is generated by a control unit of the steer-by-wire steering system in order to control the steering actuator to convert a captured steering specification.

Further advantageously, the change in the wheel steering angle of the steered wheels as a result of control by the driving state evaluation unit due to a detected critical driving situation is not converted into a corresponding steering movement of the steering handle of the steer-by-wire steering system. Advantageously, a controlling intervention by the driving state evaluation unit thus advantageously remains at least largely unnoticed for a vehicle user. In particular, a vehicle user is not unsettled by countersteering which is triggered by the driving state evaluation unit and during which the steering wheel does not adjust this steering movement, in particular does not adjust it on a 1:1 basis.

A further advantageous configuration, however, provides for a control intervention of the driving state evaluation unit, if a critical driving situation is detected by the driving state evaluation unit, to be signalled to a vehicle user via an operating element, in particular via a steering handle. Advantageously, a feedback actuator of the steer-by-wire steering system is controlled accordingly to this end. The signalling is advantageously carried out as a vibration or as a steering resistance pulse in the corresponding direction in which the steerable wheels are steered. In the context of the signalling, however, the complete steering movement is advantageously not adjusted according to the set wheel steering angle.

The motor vehicle further proposed for solving the problem mentioned at the outset comprises a steer-by-wire steering system and a driving dynamics control system, wherein the steer-by-wire steering system is designed to convert a steering specification into a wheel steering angle of steerable wheels of the motor vehicle, and wherein the driving dynamics control system is designed, taking into account a driving direction specification and a driving state of the motor vehicle, to carry out an evaluation with respect to a critical driving situation and, if a critical driving situation is detected, to stabilize the motor vehicle by targeted control of at least one brake of the motor vehicle and/or at least one drive unit of the motor vehicle in order to avoid the critical driving situation. In addition, the motor vehicle comprises a driving state evaluation unit, wherein the driving state evaluation unit is designed, in addition to the driving dynamics control system, to carry out an evaluation with respect to a critical driving situation and, if a critical driving situation is detected by the driving state evaluation unit, to cause a wheel steering angle deviating from the steering specification to be adjusted in order to stabilize the motor vehicle. This advantageously achieves the advantages described in connection with the proposed method.

According to one particularly advantageous configuration, the steer-by-wire steering system comprises a steering actuator, which acts on a coupling rod and is intended to set a wheel steering angle of the steerable wheels, and a control unit which is designed in particular to control the steering actuator in order to convert a steering specification into a corresponding wheel steering angle. Advantageously, the driving state evaluation unit is included in the control unit of the steer-by-wire steering system. The driving state evaluation unit is advantageously designed to receive input signals, in particular input signals generated by a vehicle user or by an autonomous driving system, for controlling the motor vehicle and state signals with respect to a current driving state. Further advantageously, the driving state evaluation unit is designed to determine a reference driving line for the motor vehicle based on the input signals and to detect a deviation from the reference driving line based on the state signals. Further advantageously, the driving state evaluation unit is designed to control the steering actuator in a manner deviating from a steering specification resulting from the input signals in the event of a detected deviation from the reference driving line and to set a coupling rod position required to maintain the reference driving line. Further advantageously, the driving state evaluation unit is designed to manipulate a driving direction specification with respect to a driving direction specification resulting from the input signals, and to provide the driving dynamics control system with the manipulated driving direction specification. In this way, the driving dynamics control system can advantageously intervene in a manner with improved control.

In particular, provision is made for the motor vehicle to be designed to be operated in accordance with a method designed according to the invention.

In the various figures, identical parts are generally provided with the same reference signs and are therefore also, in some cases, each explained only in conjunction with one of the figures.

FIG. 1 illustrates an exemplary embodiment of a motor vehicle 1 which is designed according to the invention, but only sections of which are shown. The motor vehicle 1 is in particular a passenger car. The motor vehicle 1 comprises a drive unit 6, a steer-by-wire steering system 2 and a driving dynamics control system 3, wherein the drive unit 6 and the driving dynamics control system 3 are only schematically illustrated.

The driving dynamics control system 3 is a conventional electronic stability control system. The driving dynamics control system 3 is designed, taking into account a current driving direction specification, in particular a steering specification E1, and a captured current driving state of the motor vehicle 1, which in particular takes into account a current speed, current acceleration values, a respective wheel speed and/or a current yaw rate of the motor vehicle 1, to carry out an evaluation with respect to a critical driving situation. For this purpose, the driving dynamics control system 3 constantly compares whether the current driving state of the motor vehicle 1 matches the current driving direction specification. If a significant deviation occurs, a critical driving situation is detected. In such a detected critical driving situation, the driving dynamics control system 3 is further designed to stabilize the motor vehicle 1 by targeted control of individual brakes 5 of the motor vehicle 1 and possibly the drive unit 6 of the motor vehicle 1, and in particular to prevent spinning of the motor vehicle 1, and thus to eliminate the critical driving situation. The driving dynamics control system 3 is not designed in this exemplary embodiment to trigger control interventions in the steer-by-wire steering system 2 of the motor vehicle.

In this exemplary embodiment, the steer-by-wire steering system 2 comprises a steering column with a steering shaft 212 and a feedback actuator 214. A steering handle 213 in the form of a steering wheel is arranged in a rotationally fixed manner at one end of the steering shaft 212. A vehicle user can use the steering handle 213 to specify a steering command which is captured as a steering specification E1, in particular by means of a steering angle sensor unit not explicitly illustrated in FIG. 1. The feedback actuator 214 is designed to exert a torque or a steering resistance torque on the steering shaft 212, in particular for conveying a steering feeling. This steering resistance torque can be perceived by a vehicle user of the motor vehicle 1 as steering resistance via the steering handle 213.

The steer-by-wire steering system 2 also has a control unit 7, in particular an ECU (ECU: Electronic Control Unit), which is designed to receive the input signals that are captured by the steering angle sensor unit and represent the steering specification E1, and to control a steering actuator 215 of the steer-by-wire steering system 2 based on these input signals in order to convert the steering specification E1 into a corresponding wheel steering angle of the steerable wheels 4 of the motor vehicle 1. In this exemplary embodiment, the steering actuator 215 has a steering pinion 216 and an electric motor 218 driving the steering pinion 216. Appropriately controlling the steering actuator 215 by means of the control unit 7 means that the steering pinion 216 is driven by the electric motor of the steering actuator 215 for the purpose of converting a steering command into a steering movement of the steerable wheels 4. In this case, the steering actuator 215 acts via the driven steering pinion 216 on a coupling rod 217 formed in this exemplary embodiment as a rack and thus triggers a steering movement of the steerable wheels 4 of the motor vehicle, wherein the steerable wheels 4 in this exemplary embodiment are connected to the coupling rod 217 via track rods 219. The track rods 219 themselves are each connected to one steered wheel 4 in a known manner via steering knuckles.

In this exemplary embodiment, the steer-by-wire steering system 2 also comprises a driving state evaluation unit 8 which is formed in this exemplary embodiment as part of the control unit 7. The driving state evaluation unit 8 is designed, in addition to the driving dynamics control system 3 and independently of the driving dynamics control system 3, to carry out an evaluation with respect to a critical driving situation. For this purpose, the driving state evaluation unit 8 evaluates on the basis of various current driving state parameters whether a specification made by a vehicle user or a specification made by a driver assistance system with regard to a driving direction is implemented accordingly by the motor vehicle. If the driving state evaluation unit 8 detects a critical driving situation based on this evaluation, the driving state evaluation unit 8 is designed to control the steering actuator 215 of the steer-by-wire steering system 2 in such a way that a different wheel steering angle of the steerable wheels 8 is set than the wheel steering angle which would actually be provided by a captured steering specification E1. In the event of a detected critical driving situation, the driving state evaluation unit 8 is thus ultimately responsible for controlling the steering actuator 215. It is possible to provide either for the driving state evaluation unit 8 to directly generate the control signal for the steering actuator 215 or for the driving state evaluation unit 8 to influence the control unit 7 accordingly such that it generates a correspondingly changed control signal. The differing control of the steering actuator 215 can in particular go so far that a wheel steering angle which is opposed to a steering specification E1 is set, in particular in order to prevent or reduce oversteering of the motor vehicle 1 by means of corresponding countersteering and thus avoid a critical driving situation.

Figure 2:
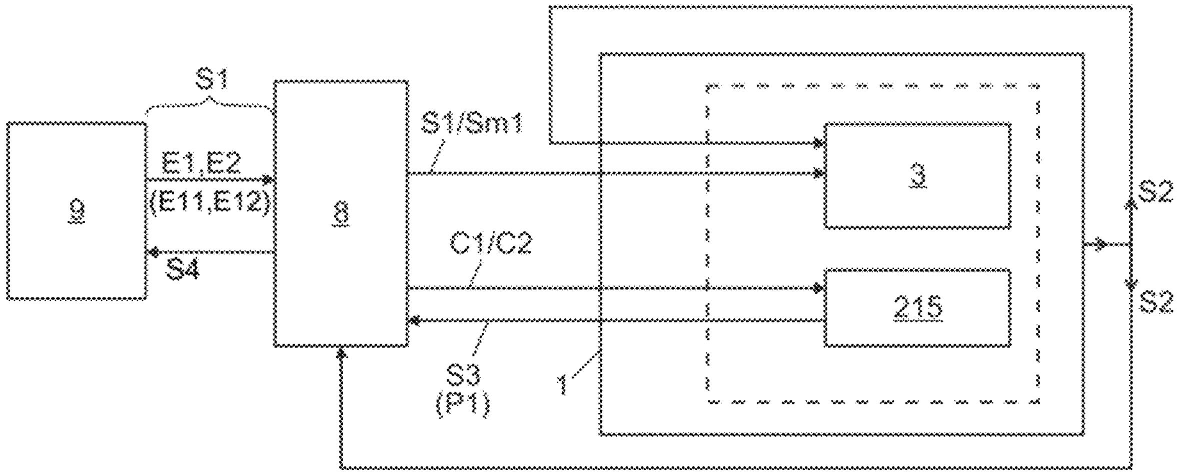
FIG. 2 shows a block diagram for explaining an exemplary embodiment of a method for operating a motor vehicle, which is designed according to the invention.

With reference to the block diagram shown in FIG. 2, an exemplary embodiment of a method designed according to the invention for operating a motor vehicle 1 with a steer-by-wire steering system 2, which, during operation of the motor vehicle 1, converts a steering specification E1 into a wheel steering angle of steerable wheels 4 of the motor vehicle 1, and a driving dynamics control system 3, which, taking into account a driving direction specification S1, Sm1 and a driving state S2 of the motor vehicle 1, carries out an evaluation with respect to a critical driving situation and, if a critical driving situation is detected, stabilizes the motor vehicle 1 by means of targeted brake control in order to rectify the critical driving situation, is explained in more detail below. In particular, provision can be made for the motor vehicle explained with reference to FIG. 1 to be designed to be operated in accordance with such a method, wherein in particular the control unit 7 of the motor vehicle 1, the driving state evaluation unit 8 and the driving dynamics control system 3 are designed to carry out and trigger the corresponding method steps.

In the method, provision is made for a driving state evaluation unit 8 to receive, from input means 9 of the motor vehicle 1, a plurality of input signals E11, E12, from which a driving direction specification S1 can be determined. In this exemplary embodiment, the input means 9 comprise in particular a steering handle, a feedback actuator, an acceleration pedal and a brake pedal, wherein a driving direction specification S1 specified by a vehicle user by means of the input means 9 is transmitted as input signals to the driving state evaluation unit 8. The input signals comprise in particular a steering angle (E11) of a steering handle that is set by a driver and a steering torque (E12) applied by a driver, which together represent a steering specification E1. Furthermore, the input signals may comprise a pedal position, a speed and a force of actuation of the pedals. According to one configuration variant, provision may also be made for the driving direction specification S1 to be provided in an autonomous driving mode by an AD driving system.

Furthermore, in the exemplary embodiment shown in FIG. 2, the driving state evaluation unit 8 receives, from the motor vehicle 1, values of parameters describing a current driving state S2 of the motor vehicle, such as in particular a current yaw rate, a current slip angle of the motor vehicle and/or current braking torques. In normal operation, if there is no critical driving situation, the driving direction specification S1 or the corresponding input signals E11, E12 is/are sent unchanged from the driving state evaluation unit 8 to the driving dynamics control system 3. In addition, the driving dynamics control system 3 receives the current driving state S2 or the parameters defining the current driving state S2 directly, i.e. without a detour via the driving state evaluation unit 8.

In this exemplary embodiment, the driving state evaluation unit 8 also controls, as part of the control unit of the steer-by-wire steering system of the motor vehicle 1, a steering actuator 215 acting on the coupling rod of the steer-by-wire steering system with a control signal C1 in order to set a coupling rod position corresponding to a wheel steering angle to be set according to the steering specification E1. The coupling rod position PI set is transmitted by the steering actuator 215, as information S3 regarding an actually set wheel steering angle of the motor vehicle 1, to the driving state evaluation unit 8.

Furthermore, the driving state evaluation unit 8 determines a reference driving line for the motor vehicle 1 based on the driving direction specification S1, in particular based on the received input signals (E11, E22), and based on the driving state S2, in particular based on the received driving state parameters. Furthermore, the driving state evaluation unit 8 checks, based on the parameters defining the current driving state S2, whether there is a deviation from the determined reference driving line outside a specified tolerance range. If such a deviation is detected by the driving state evaluation unit 8, the driving state evaluation unit 8 detects a critical driving situation. Parallel to this, the driving dynamics control system 3 also constantly checks whether there is a critical driving situation.

If the driving state evaluation unit 8 has detected a critical driving state of the motor vehicle, the driving state evaluation unit 8 controls the steering actuator 215 of the steer-by-wire steering system with a different control signal C2 from the control signal C1 in such a way that the coupling rod position P1, and thus the wheel steering angle of the steered wheels of the motor vehicle, is changed in such a way that the motor vehicle 1 follows the reference driving line again and the motor vehicle 1 is stabilized by the set wheel steering angle. The change in the wheel steering angle as a result of the control of the steering actuator 215 by the driving state evaluation unit 8 due to the detected critical driving situation is not converted into a corresponding steering movement of the steering handle 213 of the steer-by-wire steering system. This means that the steering handle does not rotate into the position that would actually correspond to the position of the steered wheels. Only when the critical driving situation is over, due to the steering intervention by the driving state evaluation unit 8 and/or the control intervention by the driving dynamics control system 3, are the steering handle and the position of the steerable wheels synchronized. The control intervention of the driving state evaluation unit 8, which deviates from the steering specification from the vehicle user, if a critical driving situation is detected by the driving state evaluation unit 8, is, however, signalled to the vehicle user by applying a signal S4 to an operating element, in particular the steering handle, in particular by applying a vibration.

If the driving state evaluation unit 8 has detected a critical driving situation because the motor vehicle deviates correspondingly strongly from the determined reference driving line, the driving state evaluation unit 8 manipulates, as an additional reaction, the driving direction specification S1 to be transmitted to the driving dynamics control system prior to transmission to the driving dynamics control system 3 in such a way that a steering angle underlying a current steering specification is increased by adding an offset in the same steering direction, and thus a larger steering angle, in particular a maximum steering angle, than the steering angle actually specified by the driver is transmitted to the driving dynamics control system 3. Instead of the driving direction specification S1, a manipulated driving direction specification Sm1 is therefore then transmitted to the driving dynamics control system 3.

Since the driving dynamics control system 3 also constantly checks the presence of a critical driving situation, the driving dynamics control system 3 detects the presence of a critical driving state substantially at the same time as the driving state evaluation unit 8 and brakes the individual wheels of the motor vehicle in a targeted manner in order to stabilize the motor vehicle. The driving dynamics control system 3 is in particular configured such that it controls an actual yaw rate in order to achieve a target yaw rate resulting from the driving direction specification S1 and the driving state S2. Due to the manipulated driving direction specification S1 or due to the transmission of a value greater than the actual value of the set steering angle by the driving state evaluation unit 8, the control intervention is thus stronger. If the driving situation is again evaluated as non-critical by the driving state evaluation unit 8, the driving direction specification, which is also received by the driving state evaluation unit 8, is again forwarded in unchanged form to the driving dynamics control system 3.

Figure 3:
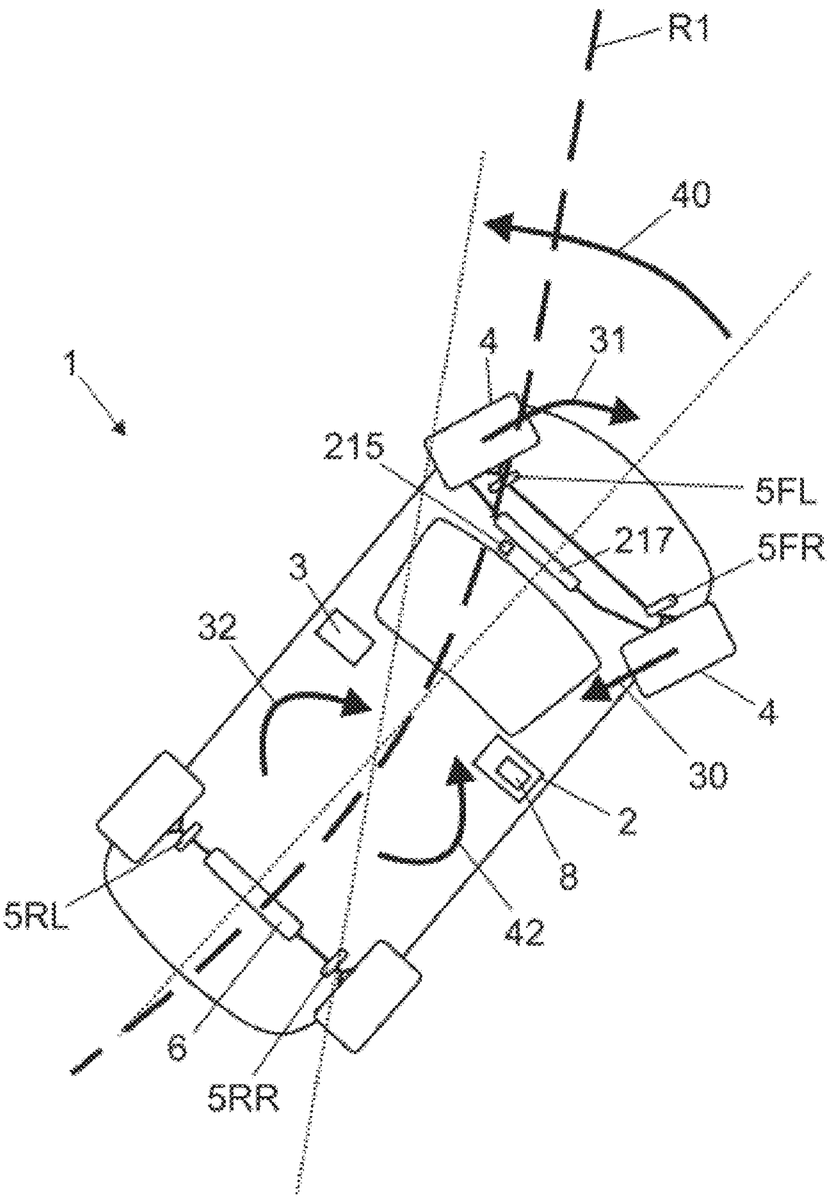
FIG. 3 shows a simplified plan view of a further exemplary embodiment of a motor vehicle designed according to the invention in a detected first critical driving situation.
Figure 4:
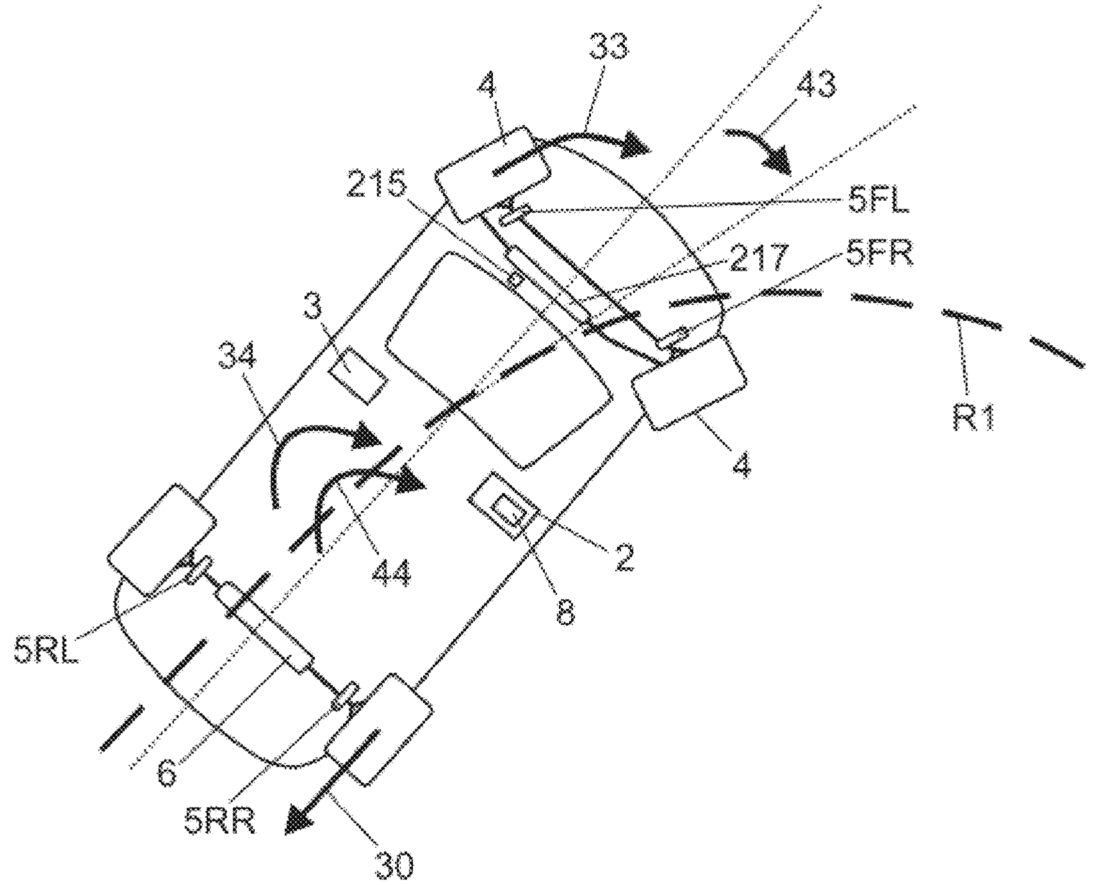
FIG. 4 shows a simplified plan view of the motor vehicle from FIG. 3 in a detected second critical driving situation.

FIG. 3 and FIG. 4 each illustrate a motor vehicle 1 which is designed to be operated in accordance with a method designed according to the invention, in particular in accordance with a method as explained with reference to FIG. 2. The motor vehicle 1 comprises a steer-by-wire steering system 2 with a driving state evaluation unit 8 and a driving dynamics control system 3. The driving dynamics control system 3 and the driving state evaluation unit 8 are each designed to carry out an evaluation with respect to a critical driving situation independently of each other taking into account a driving direction specification and a driving state of the motor vehicle. If a critical driving situation is detected, the driving dynamics control system 3 stabilizes the motor vehicle, in order to rectify the critical driving situation, by targeted braking of individual wheels 4 of the motor vehicle 1, which is carried out in particular by controlling the respective brakes 5 of the motor vehicle 1 and the drive unit 6 of the motor vehicle 1. The driving state evaluation unit 8 also causes a wheel steering angle of the steerable wheels 4 to be set by means of the steering actuator 215 acting on the coupling rod 217 of the steer-by-wire steering system 2, which further contributes to stabilizing the motor vehicle. The driving state evaluation unit 8 constantly determines a reference driving line R1 during operation of the motor vehicle 1 based on a current driving direction specification and a current driving state of the motor vehicle 1, wherein the driving state evaluation unit 8 controls the steering actuator 215 such that the motor vehicle follows the reference driving line R1. Normally, i.e. when there is no critical driving situation, the steering actuator 215 is controlled in accordance with a steering specification from a vehicle user or an AD driving system. However, if the motor vehicle 1 deviates from the determined reference driving line R1, the driving state evaluation unit 8 controls the steering actuator 215 in a manner deviating from the steering specification in order to cause the motor vehicle 1 to continue to follow the reference driving line 1.

FIG. 3 and FIG. 4 each show a detected critical driving situation, where FIG. 3 illustrates oversteering of the motor vehicle 1 and FIG. 4 illustrates understeering of the motor vehicle 1. FIG. 3 and FIG. 4 also each illustrate the reference driving lines RI which are determined by the driving state evaluation unit 8 and are each intended to be followed by the motor vehicle 1 according to the driving direction specification.

In the driving situation illustrated in FIG. 3, the driving state evaluation unit 8 now controls the steering actuator 215 in such a way that the steered wheels 4 perform a countersteering movement, as a result of which the slip angle that is directed towards the inside of the bend (arrow 40) is reduced (arrow 31) and the yaw rate that is increased compared to the reference yaw rate (arrow 42) is reduced (arrow 32). The driving dynamics control system 3 also brakes the front wheel 4 on the outside of the bend by appropriately controlling the front right-hand brake 5FR (arrow 30). The measures of the driving state evaluation unit 8 and the driving dynamics control system 3 prevent the motor vehicle 1 from spinning and cause the motor vehicle 1 to follow the reference driving line R1.

In the driving situation which is illustrated in FIG. 4 and in which understeering of the motor vehicle 1 occurs, the driving state evaluation unit 8 controls the steering actuator 215 such that the wheel steering angle of the steered wheels 4 is reduced (arrow 33), as a result of which the tyre adhesion to the ground is increased. The driving dynamics control system 3 also brakes the rear wheel on the inside of the bend by appropriately controlling the rear right-hand brake 5RR (arrow 30), as a result of which the yaw rate which is reduced compared to the reference yaw rate (arrow 44) is increased (arrow 34) and the slip angle (43) directed towards the outside of the bend is increased. The measures of the driving state evaluation unit 8 and the driving dynamics control system 3 prevent the motor vehicle 1 from spinning and cause the motor vehicle 1 to follow the reference driving line R1.

In the event of understeering of the motor vehicle 1, the following is thus provided in particular: The driver uses the steering wheel and the pedals to specify the reference driving line R1. The driving dynamics control system 3 intensifies the braking effect on the inner rear wheel (control of the brake 5RR). The steering actuator 215 reduces the steering angle in a manner prompted by the driving state evaluation unit 8. The vehicle speed of the motor vehicle 1 is reduced, in particular by appropriately controlling the drive unit 6 of the motor vehicle 1. Even if the driver increases the steering wheel angle, the steering actuator 215 is still controlled in such a way that the reference driving line R1 is maintained, and so the steering angle is not necessarily increased.

In the event of oversteering of the motor vehicle 1, the following is provided in particular: The driver uses the steering wheel and the pedals to mark the reference driving line R1. The driving dynamics control system intensifies the braking effect on the outer front wheel (control of the brake 5FR). The steering actuator 215 changes the wheel steering angle in a manner prompted by the driving state evaluation unit 8 such that a countersteering movement occurs (steers out of the bend). The vehicle speed of the motor vehicle is reduced, in particular by appropriately controlling the drive unit 6 of the motor vehicle 1. Even if the driver increases the steering wheel angle, the steering actuator 215 is still controlled in such a way that the reference driving line R1 is maintained, and so countersteering is continued in this case (which is the opposite of what the driver does). If the driving state evaluation unit 8 also manipulates the driving direction specification to be transmitted to the driving dynamics control system 3 and furthermore specifies the steering angle set by the driver or even a larger steering angle, the driving dynamics control system 3 further actively intervenes in a controlling manner in order to reduce the oversteer effect.

The exemplary embodiments illustrated in the figures and explained in conjunction therewith serve to explain the invention and have no limiting effect thereon.

LIST OF REFERENCE SIGNS

1 Motor vehicle
2 Steer-by-wire steering system
212 Steering shaft

213 Steering handle
214 Feedback actuator
215 Steering actuator
216 Steering pinion
217 Coupling rod
218 Electric motor
219 Track rod
3 Driving dynamics control system
4 Steerable wheel
5 Brake
6 Drive unit
7 Control unit of the steer-by-wire steering system
8 Driving state evaluation unit
9 Input means
30 Brake the wheel
31 Reduction of the slip angle
32 Reduction of the yaw rate
33 Reduction of the steering angle
34 Increase of the yaw rate
40 Slip angle of the motor vehicle
42 Yaw rate higher than the reference yaw rate
43 Slip angle of the motor vehicle
44 Yaw rate lower than the reference yaw rate
C1 Control signal
C2 Control signal
E1 Steering specification
E11 Input signal (steering angle)
E12 Input signal (steering torque)
E2 Pedal position
P1 Coupling rod position
R1 Reference driving line
S1 Driving direction specification
S2 Driving state
S21 Driving state signal
S22 Driving state signal
S3 Information regarding an actually set wheel steering angle
S4 Information signal to vehicle user
Sm1 Manipulated driving direction specification

The invention claimed is:

1. A method for operating a motor vehicle with a steer-by-wire steering system, a driving state evaluation unit, and a driving dynamics control system, comprising:

converting, by the steer-by-wire steering system, a captured steering specification into a wheel steering angle of steerable wheels of the motor vehicle;

detecting, by the driving state evaluation unit, a critical driving situation, and, in response:

changing the wheel steering angle to stabilize the motor vehicle; and manipulating the captured steering specification before transmission to the driving dynamics control system;

carrying out, by the driving dynamics control system, taking into account the manipulated captured steering specification and a driving state of the motor vehicle, an evaluation with respect to a critical driving situation; and if a critical driving situation is detected by the driving dynamics control system, stabilizing the motor vehicle by targeted control of at least one brake of the motor vehicle and/or at least one drive unit of the motor vehicle in order to rectify the critical driving situation.

2. The method according to claim 1, wherein the captured steering specification is manipulated by increasing a value for the steering angle underlying the steering specification.

3. The method according to claim 2, wherein the increase is effected by replacing the steering angle value actually underlying the captured steering specification with a maximum possible steering angle value of the same steering direction.

4. The method according to claim 1, wherein the driving state of the motor vehicle is transmitted to the driving state evaluation unit and to the driving dynamics control system, wherein the evaluation with respect to a critical driving situation is carried out by the driving state evaluation unit and by the driving dynamics control system independently of each other.

5. The method according to claim 1, wherein a driving direction specification is transmitted to the driving state evaluation unit, and the driving direction specification is transmitted from the driving state evaluation unit to the driving dynamics control system.

6. The method according to claim 1, wherein information regarding an actually set wheel steering angle of the motor vehicle is transmitted to the driving state evaluation unit.

7. The method according to claim 1, wherein the driving state evaluation unit determines a reference driving line for the motor vehicle based on the driving direction specification and the driving state and detects a critical driving situation in the event of a deviation from this reference driving line.

8. The method according to claim 7, wherein the driving state evaluation unit controls a steering actuator of the steer-by-wire steering system in such a way that the wheel steering angle is changed in such a way that the motor vehicle follows the reference driving line.

9. The method according to claim 1, wherein the change in the wheel steering angle as a result of control by the driving state evaluation unit due to a detected critical driving situation is not converted into a corresponding steering movement of the steering handle of the steer-by-wire steering system.

10. The method according to claim 1, wherein a control intervention of the driving state evaluation unit, if a critical driving situation is detected by the driving state evaluation unit, is signalled to a vehicle user via an operating element.

11. A motor vehicle, comprising:

a steer-by-wire steering system;

a driving dynamics control system; and a driving state evaluation unit;

wherein the steer-by-wire steering system is configured to convert a captured steering specification into a wheel steering angle of steerable wheels of the motor vehicle;

wherein the driving state evaluation unit is configured to detect a critical driving situation, and, in response, change the wheel steering angle to stabilize the motor vehicle and manipulate the captured steering specification before transmission to the driving dynamics control system;

wherein the driving dynamics control system is configured, taking into account the manipulated captured steering specification and a driving state of the motor vehicle, to carry out an evaluation with respect to a critical driving situation and, if a critical driving situation is detected by the driving dynamics control system, to stabilize the motor vehicle by targeted control of at least one brake of the motor vehicle and/or at least one drive unit of the motor vehicle in order to avoid the critical driving situation.

12. The motor vehicle according to claim 11, wherein the steer-by-wire steering system comprises:

a steering actuator, which acts on a coupling rod and is configured to convert a steering specification; and a control unit;

wherein the driving state evaluation unit is included in the control unit of the steer-by-wire steering system;

wherein the driving state evaluation unit is configured to receive input signals for controlling the motor vehicle and state signals with respect to a current driving state, to determine a reference driving line based on the input signals and to detect a deviation from the reference driving line based on the state signals, to control the steering actuator in a manner deviating from a steering specification resulting from the input signals in the event of a detected deviation from the reference driving line and to set a coupling rod position required to maintain the reference driving line, and to manipulate a driving direction specification with respect to a driving direction specification resulting from the input signals, and to provide the driving dynamics control system with the manipulated driving direction specification.

* * * * *